United States Patent [19]

McMillen

[11] Patent Number: 5,111,706
[45] Date of Patent: May 12, 1992

[54] ENGINE STARTER PINION DRIVE ASSEMBLY

[75] Inventor: Bobby E. McMillen, Columbus, Miss.

[73] Assignee: United Technologies Motor Systems, Inc., Columbus, Miss.

[21] Appl. No.: 669,267

[22] Filed: Mar. 14, 1991

[51] Int. Cl.⁵ .............................. F02N 15/06
[52] U.S. Cl. ...................... 74/7 C; 74/7 R; 403/326; 403/361
[58] Field of Search .............. 74/6, 7 R, 7 C; 192/42; 29/453; 403/329, 361

[56] References Cited

U.S. PATENT DOCUMENTS

| | | | |
|---|---|---|---|
| 1,988,595 | 1/1935 | Hiss | 29/453 X |
| 2,978,927 | 4/1961 | Blanton | 29/453 X |
| 3,216,538 | 11/1965 | Miller | 29/453 X |
| 3,690,188 | 9/1972 | McMillen | 74/7 R |
| 4,255,982 | 3/1981 | Kern | 74/7 R |
| 4,502,429 | 3/1985 | Ebihara | 74/7 R X |
| 4,646,371 | 3/1987 | Nowell | 403/361 X |
| 4,785,679 | 11/1988 | Weber et al. | 74/7 R |

Primary Examiner—Allan D. Herrmann
Attorney, Agent, or Firm—Ronald G. Cummings

[57] ABSTRACT

An engine starter pinion drive and method for assembly which comprises a starter motor with an armature shaft, a clutch subassembly, a pinion gear for engaging and disengaging an engine drive gear, an anti-drift spring and a retainer sleeve locking the clutch subassembly in position on the armature shaft. The retainer sleeve is configured for axial push-on mounting to the armature shaft with a plurality of tabs for snap lock engagement with a groove in the armature shaft.

10 Claims, 1 Drawing Sheet

ENGINE STARTER PINION DRIVE ASSEMBLY

TECHNICAL FIELD

The present invention relates to a starting apparatus for an internal combustion engine and more particularly to an engine starter pinion drive and method of assembly.

BACKGROUND AND SUMMARY OF THE INVENTION

Electric starter motors are widely utilized for cranking small gasoline engines such as those utilized in garden tractors, lawn mowers, snow blowers, outboard motors for boats, etc. In such a starter, a pinion drive provides the means for momentarily engaging the engine flywheel in transferring power from the electric starting motor to the internal combustion engine and then disengaging the starter motor from the flywheel once the engine has started to prevent damage to the starter motor. The most common way to facilitate engagement and disengagement of the pinion to the flywheel is to mount the pinion gear to a shaft so that it is rotatably driven by the motor and is axially movable along the shaft. The axial movement allows full engagement of the pinon gear with the flywheel during cranking and complete disengagement once the engine has started. The axial travel of the pinion gear is generally facilitated by one of two means. The pinion gear is either forced along the shaft by a solenoid or by inertia of the pinion gear interacting with the accelerating motor shaft by means of mating helical threads on the pinion gear and on the shaft. Exemplary starter assemblies are disclosed in Kern, U.S. Pat. No. 4,255,982 and McMillan, U.S. Pat. No. 3,690,188 which are incorporated herein by reference. In a typical configuration such as shown in U.S. Pat. No. 4,225,982, the flywheel of an internal combustion engine has gear teeth at its outer periphery and is juxtaposed with a spring biased pinion gear coupled to the output shaft of a starting motor through a torque-limiting friction clutch and a helical spline. When the starting motor is activated and begins to rotate, the inertia of the pinion gear resists rotation and the helical spline causes the pinion gear to translate axially along the starting motor shaft and into engagement with the gear teeth on the flywheel. The engine is thus cranked until the engine speed passes the speed at which it is driven by the starter motor whereupon the helical spline causes the pinion gear to disengage from the flywheel gear teeth. An anti-drift spring operates to urge the pinion gear toward the disengaged position.

As can be appreciated, a pinion drive assembly is subjected to high shock and loading stresses as it engages and disengages the engine flywheel. Such stresses are inherent as the motor armature and pinion are rotating as the pinion gear engages the large mass of the flywheel and engine components which are at rest. Also, once the engine is started, it begins to drive the starter assembly and the pinion gear is driven back along the shaft causing it to impact the armature shaft as it comes to rest against a stop. Consequently, a pinion drive assembly must be rugged overall and durable to withstand these high stresses and provide reliable operation.

In assembly, various methods have been utilized to retain the pinion drive assembly in place on the motor shaft. A typical configuration such as that shown in U.S. Pat. No. 3,690,188 utilizes a nut threaded to the terminal end of the motor shaft. Other types of retainers include a clutch retainer secured to the motor shaft by a spiral pin through a radial aperture in the motor shaft or a C-clip engaging a precision groove in the motor shaft. These types of securement exhibit shortcomings in terms of automated assembly and/or cost-effectiveness. For example, these retainers tend to be a relatively small-tolerance means of securement which increases cost. Further, the assembly steps which require radial or angular movement increases the relative complexity of automated assembly.

Accordingly, it is an object of the present invention to provide a new and improved engine starter apparatus and method of assembly which is highly automatable and cost-effective.

Another object of the invention is to provide a pinion drive assembly with a relatively high tolerance means of securement to a starting motor shaft.

A further object of the invention is to provide such a pinion drive assembly with a push-on means of securement which particularly facilitates automated assembly.

Another object of the invention is to provide an engine starter apparatus which is rugged, durable and reliable in use.

It has been found that the foregoing objectives are attained in an engine starter assembly which includes a starter motor having a rotatable shaft extending therefrom, a clutch subassembly slidably mounted on the shaft for frictionally coupling a pinion gear to the shaft, a pinion gear adapted for engaging and disengaging an engine drive gear and a drive retainer sleeve to retain the clutch subassembly on the shaft. The retainer sleeve is configured for push-on mounting over the terminal end portion of the motor shaft in snap lock engagement with the shaft to retain the clutch assembly on the shaft. The retainer sleeve includes a plurality of locking tabs configured for snap lock engagement with a circumferential groove on the motor shaft.

In the method of assembly, the clutch subassembly is positioned on the motor shaft adjacent the starter motor and the pinion gear is interconnected to the clutch assembly about the motor shaft. A clutch retainer sleeve is mounted to the shaft by axially pushing the retainer sleeve over the outer end of the motor shaft into snap lock engagement with the shaft to securely lock the clutch subassembly in place. The push-on mounting and locking action of the retainer sleeve is particularly adaptable to automated assembly.

DESCRIPTION OF THE PREFERRED EMBODIMENT

Figure 3:
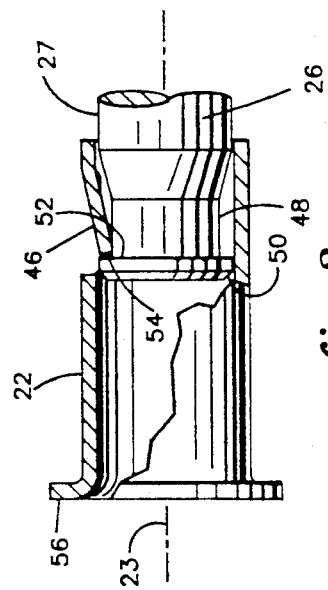
FIG. 3 is a longitudinal sectional view of the retainer sleeve of the present invention.

Although specific forms of the present invention have been selected for illustration in the drawings, and the following description is drawn in specific terms for the purpose of describing these forms of the invention, the description is not intended to limit the scope of the invention which is defined in the appended claims.

Figure 1:
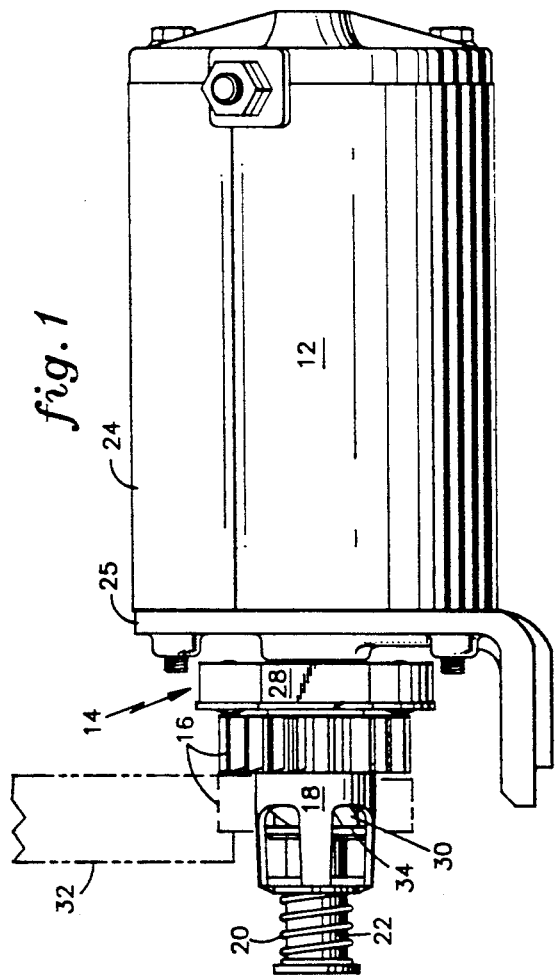
FIG. 1 is a partly broken away side view of the engine starter assembly of the present invention.
Figure 2:
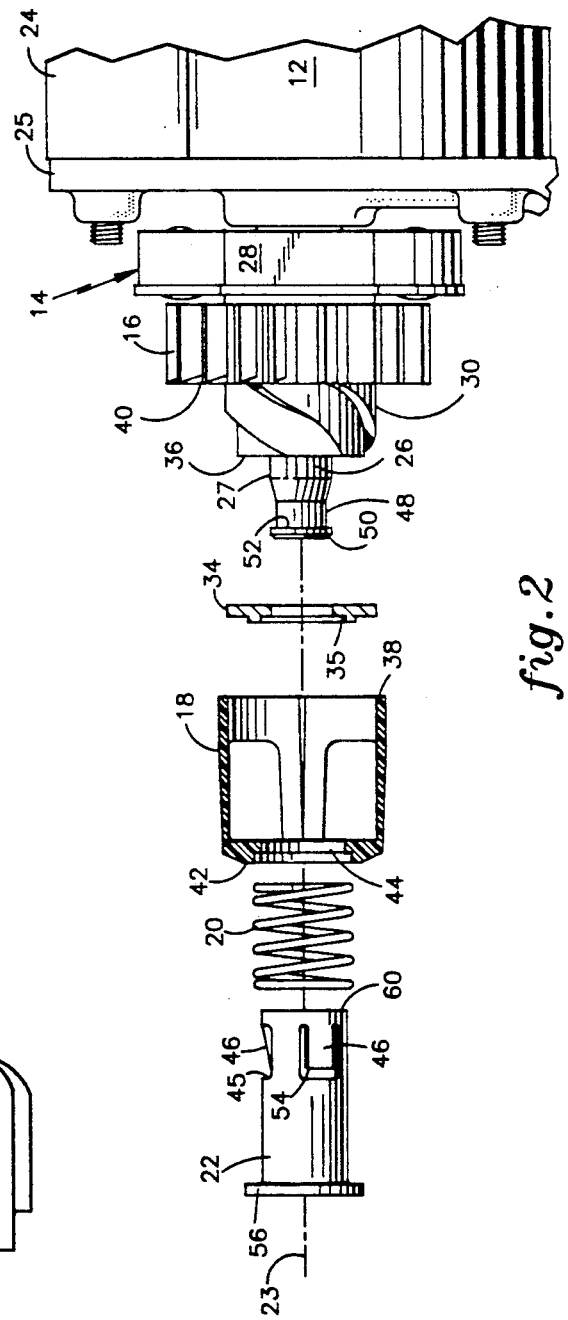
FIG. 2 is an exploded view of the pinion drive assembly of FIG. 1.

Referring the FIGS. 1 and 2, the engine starter assembly of the present invention generally comprises a starter motor 12, a clutch subassembly 14, a pinion gear 16, a cover 18, an anti-drift spring 20 and a retainer sleeve 22.

The motor 12 is a conventional 12 volt DC starter motor having a housing 24 and an armature shaft 26 extending therefrom. The clutch subassembly 14 is slidably mounted on the shaft 26 and abuts a shoulder stop on the shaft 26 adjacent the endcap 25 of motor 12. The clutch subassembly 14 is a conventional clutch configuration to frictionally couple the motor shaft 26 to the pinion gear 16 and absorb torsional shock loading during the cranking cycle of the starter assembly. The clutch subassembly 14 comprises a drive plate 28 which is keyed to the motor shaft 26 and which drives a threaded spindle 30 via a slip clutch (not shown). A conventional slip clutch includes a spring-washer, clutch plate, and a spindle keyed to a spindle plate by a spline arrangement (all not shown). The clutch subassembly is conventional and need not be shown in greater detail for purposes of the present invention.

The pinion gear 16 is adapted to engage the gear teeth of the flywheel 32 and is mounted concentrically on the spindle 30. The pinion gear 16 has an internal helical thread that mates with the external helical thread of the spindle 30 so that any relative movement between the spindle and the pinion gear will cause the pinion gear to move axially along the spindle 30 and thus the motor shaft 26 in a conventional manner.

A washer 34 is mounted concentrically on the shaft 26 and abuts the outer end 36 of the spindle 30. The diameter of the washer 34 is greater than the spindle 30 so that the washer 34 forms a stop for the pinion gear 16 in the engaged position shown in a broken line in FIG. 1. The tubular cover 18 slightly frusto-conical in shape and is mounted concentrically about the washer 30 and spindle 34 for sliding movement axially along the shaft 26. The inner end 38 of cover 18 abuts the outer face 40 of pinion gear 16 and the outer face 42 has a central aperture 44 dimensioned to loosely receive the retainer sleeve 22.

The retainer sleeve 22 is generally cylindrical or tubular shaped with an inner end section 45 having a plurality of circumferentially spaced tabs 46 configured for snap lock engagement with a ring groove 48 in the end portion 27 of motor shaft 26. As best seen in FIG. 3, the tabs 46 extend axially and inwardly relative to the longitudinal axis 23 of retainer 22. The groove 48 is configured for snap lock engagement with the tabs 46 of the retainer 22. The groove 48 forms an annular shoulder 50 at the outer end of shaft 26 with an inwardly disposed face 52 adapted to abut the distal edges 54 of tabs 46 to securely retain the retainer 22 on the shaft 26 when the sleeve is push-on mounted over the end portion 27 of shaft 26. The inner diameter of the inner end 60 of retainer 22 is dimensioned for tight-fitting reception of the shoulder 50 during assembly and, as seen in FIG. 3, the tabs 46 extend radially inwardly therefrom. The retainer 22 is preferably constructed of relatively heavy gage carbon spring steel so that the snap lock engagement of the tabs 46 within the groove 40 securely locks the retainer 22 to the shaft 26. Moreover, the snap-lock securement of the retainer 22 to the shaft is a relatively high tolerance securement means for a pinion drive assembly.

The outer end of the retainer 22 has a flange 56 dimensioned to retain the helical compression spring 20 which is coaxially mounted about the sleeve 22. The outer end of the anti-drift spring 20 is retained by the flange 56 while the inner end of the spring abuts the outer end 42 of the cover 18 to thereby urge the pinion gear 16 inwardly toward the disengaged position.

The inner end 60 of the retainer 22 is seated within an annular groove 35 in the washer 34. In a preferred embodiment of the retainer 22, the cylindrical retainer is fabricated from sheet steel. The tabs 46 are cut and bent and the sheet is rolled to a tubular shape with a longitudinal seam. The seating of the inner end 60 within the groove of washer 34 prevents the retainer 22 from spreading under stress and loading.

In assembly, the clutch subassembly is slidably mounted on the shaft 26 to abut a stop adjacent the end cap of the motor housing. The pinion gear 16 is threaded on the spindle 30 of the clutch subassembly. The washer 34 is slid axially on the shaft up against the outer end of spindle 30. The cover 18 is moved axially over the washer and spindle so as to abut the pinion gear 16. The spring 58 is positioned coaxially about the retainer 22 and then the retainer is pushed axially onto the shaft 26 until the tabs 46 snap lock into the ring groove 48 of the shaft 26 to provide a positive locking of the retainer 22 to the shaft 26. In this position, the retainer firmly secures the clutch subassembly against the stop and the washer against the end of spindle 30 while retaining the spring 20 in position to bias the cover 18 against the pinion gear 16. In the assembly process, the clutch subassembly, the washer, the cover, and the retainer sleeve are all mounted on the shaft 26 by axial positioning rather than radial or angular movement. This type of positioning and mounting is highly adaptable to automated assembly.

As can be seen, the engine starter apparatus and method of assembly described herein are highly automatable and cost-effective. The push-on drive retainer 22 particularly facilitates automated assembly and contributes to the rugged, durable and reliable operation of the engine starter disclosed. Moreover, the push-on retainer 22 is cost-effective to fabricate and use in assembly and does not entail low tolerance requirements. Accordingly, the present invention accomplishes at least all of its stated objectives.

As will be apparent to persons skilled in the art, various modifications and adaptations of the structure above described will become readily apparent without departure from the spirit and scope of the invention, the scope of which is defined in the appended claims.

What is claimed is:

1. An engine starter assembly comprising
   a starter motor having a housing and a rotatable shaft extending therefrom, said shaft having a terminal end portion,
   a clutch subassembly slidably mounted on aid shaft for frictionally coupling a pinion gear to the shaft,
   a pinion gear adapted for engaging an engine drive gear, said pinion gear being mounted for axial movement along said shaft between a first position engaging the drive gear and a second position disengaged from the drive gear, and
   a retainer sleeve configured for axial push-on mounting over the end portion of said shaft, said retainer sleeve having means for snap lock engagement with said shaft to retain said clutch subassembly on said shaft.

2. The assembly of claim 1 wherein said sleeve is generally cylindrical.

3. The assembly of claim 2 wherein said sleeve is dimensioned to slidably receive said shaft in tight-fitting relationship.

4. The assembly of claim 1 which comprises
a helical spring interconnected for biasing said pinion gear toward said second position, said spring having inner and outer ends, and
said retainer sleeve having opposite inner and outer ends, said outer end having a flange retentively engaging said outer end of said spring.

5. An engine starter assembly comprising
a starter motor having a housing and a rotatable shaft extending therefrom, said shaft having a terminal end portion and a circumferential groove,
a clutch subassembly slidably mounted on said shaft for frictionally coupling a pinion gear to the shaft,
a pinion gear adapted for engaging an engine drive gear, said pinon gear being mounted for axial movement along said shaft between a first position engaging the drive gear and a second position disengaged from the drive gear, and
a retainer sleeve configured for axial push-on mounting over the end portion of said shaft, said retainer sleeve having means for snap lock engagement with said shaft to retain said clutch subassembly on said shaft, said means for snap lock engagement comprising a plurality of tabs configured for snap lock engagement in said groove.

6. The assembly of claim 5 wherein said groove forms a shoulder facing said motor housing and each said tab extends axially toward said shaft with a distal end adapted to abut said shoulder to retain said sleeve on said shaft.

7. An engine starter assembly comprising
a starter motor having a housing and a rotatable shaft extending therefrom, said shaft having a terminal end portion.
a clutch subassembly slidably mounted on said shaft for frictionally coupling a pinion gear to the shaft,
a pinion gear adapted for engaging an engine drive gear, said pinion gear being mounted for axial movement along said shaft between a first position engaging the drive gear and a second position disengaged from the drive gear,
a generally cylindrical retainer sleeve configured for axial push-on mounting over the end portion of said shaft, said retainer sleeve having means for snap lock engagement with said shaft to retain said clutch subassembly on said shaft, and
a washer mounted on said shaft between said pinion and said sleeve.
said sleeve having an inner circular end and said washer having an annular groove to seat the inner end of said sleeve.

8. An engine starter assembly comprising
a starter motor having a housing and a rotatable shaft extending therefrom, said shaft having a terminal end portion and a shoulder facing said motor housing,
a clutch subassembly slidably mounted on said shaft for frictionally coupling a pinion gear to the shaft,
a pinion gear adapted for engaging an engine drive gear, said pinion gear being mounted for axial movement along said shaft between a first position engaging the drive gear and a second position disengaged from the drive gear, and
a retainer sleeve configured for axial push-on mounting over the end portion of said shaft, said retainer sleeve having means for snap lock engagement with said shaft to retain said clutch subassembly on said shaft, said means for snap lock engagement comprising a plurality of tabs extending axially and inwardly toward said shaft, each said tab having a distal end adapted to abut said shoulder to retain said sleeve on said shaft.

9. A method of assembly for a starter pinion assembly to the output shaft of a starter motor wherein the starter pinion assembly includes a clutch subassembly, a pinion gear and a clutch retain, comprising the steps of
positioning the clutch subassembly on the output shaft adjacent the starter motor,
interconnecting a pinion gear to the clutch assembly about said shaft, and
axial push-on mounting the retainer over the outer end of the output shaft into locking engagement therewith so as to lock said clutch subassembly adjacent the starter motor.

10. The method of claim 9 wherein the starter pinion assembly further includes a helical spring for urging the pinion gear toward a disengaged position, comprising
interconnecting the spring about said shaft to urge the pinion gear toward a disengaged position, and
axially positioning the retainer on said shaft in engagement with said spring so as to retain the spring in position to urge the pinion gear toward the disengaged position.

* * * * *

UNITED STATES PATENT AND TRADEMARK OFFICE
CERTIFICATE OF CORRECTION

PATENT NO. : 5,111,706

DATED : May 12, 1992

INVENTOR(S) : Bobby E. McMillen

It is certified that error appears in the above-identified patent and that said Letters Patent is hereby corrected as shown below:

Column 4, line 55: "aid" should be --said--.

Column 6, line 32: "retain" should be --retainer--.

Signed and Sealed this

Thirty-first Day of August, 1993

*Attest:*

BRUCE LEHMAN

*Attesting Officer*  *Commissioner of Patents and Trademarks*